June 22, 1937.　　　　C. G. BONDESON　　　　2,084,961
DUPLEX CONNECTER
Filed Nov. 22, 1934
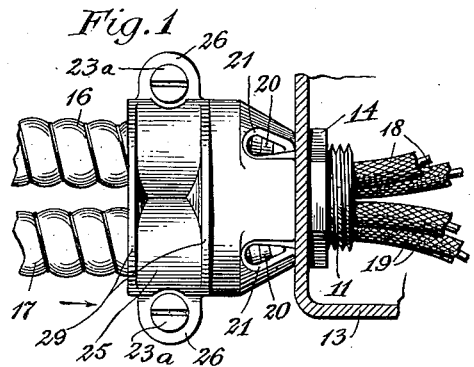
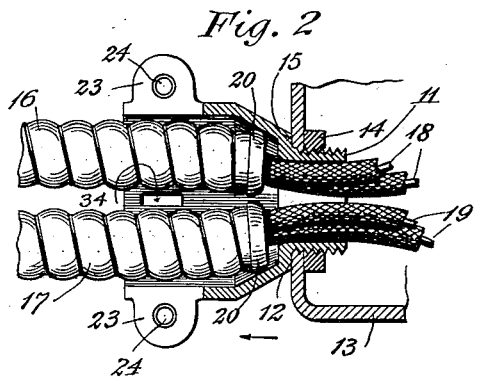
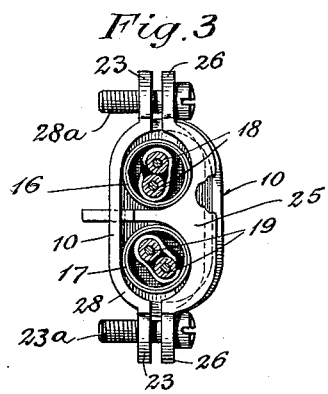
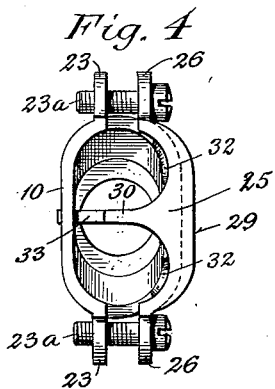
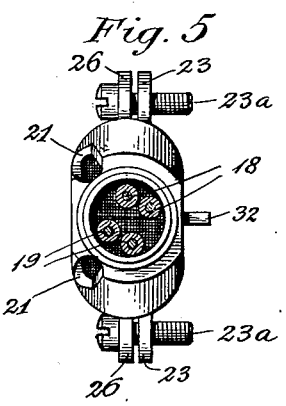
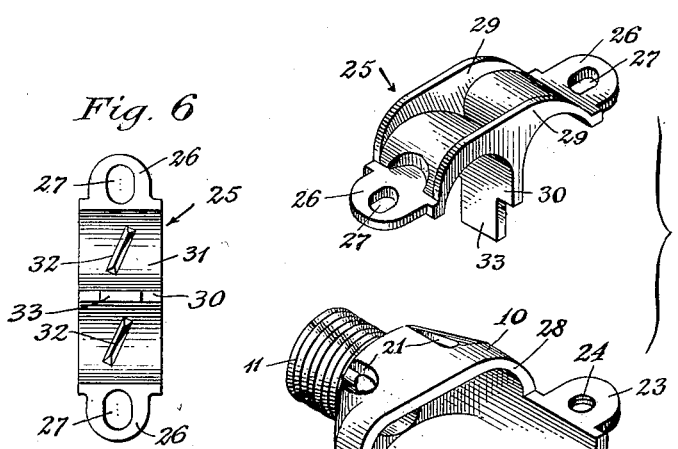
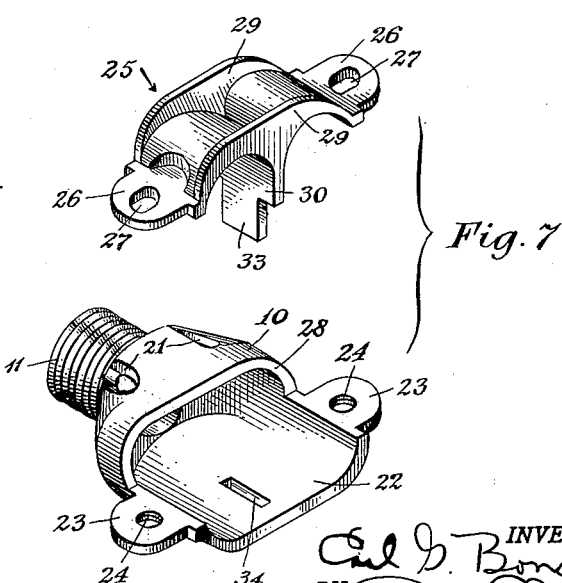
INVENTOR
Carl G. Bondeson
BY
ATTORNEY Patented June 22, 1937

2,084,961

UNITED STATES PATENT OFFICE 2,084,961

DUPLEX CONNECTER

Carl G. Bondeson, Terryville, Conn., assignor to The Andrew Terry Company, Terryville, Conn., a corporation of Connecticut Application November 22, 1934, Serial No. 754,284

5 Claims. (Cl. 285—25)

This invention relates to electrical connecters, and more particularly, to a device for connecting two armored cables or the like to an outlet box and providing for the entrance from the device into the outlet box through a single hole.

An object of this invention is to provide a duplex connecter in which the armored cables will be firmly and securely anchored to the connecter against being pulled therefrom when strains are applied to the cables.

A further object of this invention is to provide a duplex connecter as above specified which may be economically manufactured and which is simple in construction and easily used.

A still further object of this invention is to provide a duplex connecter with means for disclosing whether or not the ends of the armored cable are provided with insulators while the cables remain clamped in position to the device.

Other features and advantages will hereinafter appear.

In the accompanying drawing which shows one form of this invention, that at present preferred—

Figure 1 is a side view showing an outlet box in section and the connecter of the present invention secured in place thereon.

Fig. 2 is a view similar to Fig. 1, but shows the connecter partly in section.

Fig. 3 is an end view of a connecter showing the armored cables clamped in position.

Fig. 4 is an end view of the device showing the cable jaw released and in position to receive the ends of the cable.

Fig. 5 is also an end view, but from the side having the reduced portion or neck which enters the outlet box hole.

Fig. 6 shows the movable clamping jaw removed from the body of the connecter.

Fig. 7 is a perspective view of the connecter of the present invention, showing the movable clamping jaw raised therefrom.

As illustrated in the accompanying drawing, the connecter of this invention comprises a body portion 10 having at one end a cylindrical threaded neck 11 adapted to be inserted in a hole 12 in an outlet box 13 or the like, and to thereafter receive a lock-nut 14 which, upon being tightened, draws a shoulder 15 against the margin of the hole 12 and clamps the connecter to the outlet box.

As above stated, the connecter of the present invention is intended to connect two armored cables 16 and 17 to the outlet box so that wires 18 and 19 thereof may enter the outlet box through the single hole 12.

Accordingly, the cavity in the body portion 10 is substantially oval at the introductory side to receive the cables 16 and 17 side-by-side, and tapers toward the cylindrical neck 11, the internal walls of the tapered portions serving as stops to limit the movement of the cables toward the neck 11.

In many places, it is required that the end of the armored cable be provided with an insulating sleeve 20 to prevent the wires thereof from being chafed by sharp burrs etc. on the end of the armor.

To facilitate the enforcement of this requirement, a wall of the body portion 10 is, according to this invention, provided with two apertures or slots 21 through which the insulators, if the same are present on the cables, may be seen. These slots preferably are on the same side of the body portion 10 so that the ends of both armored cables, or the insulators carried thereby, may be perceived simultaneously.

Moreover, they are preferably formed on the tapering walls of the body so that they may be formed in casting the connecter, thereby avoiding the extra cost which would be involved if they had to be drilled or pierced by a separate operation. Providing the slots on the tapering wall permits the slots to be cast-in the body without the use of baked cores, which increase the cost of casting substantially.

To clamp the armored cables to the connecter, the lower part of the body portion 10 is provided with a rearward extension forming one jaw 22 for engaging the armored cables. This fixed jaw 22 is provided with a pair of ears 23 which have screw-threaded holes 24.

Cooperating with the fixed jaw 22 is a movable clamp or jaw 25 provided with ears 26 having apertures 27 through which extends draft members or screws 23a threaded in the ears 23.

The movable jaw 25 corresponds generally to the fixed jaw 22 and fits over the same, and when drawn down into final position firmly engages the armored cables resting on the jaw 22, clamps the cables between itself and the fixed jaw, and forms, in effect, an extension of the upper part of the body portion 10.

To close the space between the rear edge 28 of the body portion 10 and the adjacent edge of the movable jaw 25, even when the latter is drawn down close to the fixed jaw 22, as when a cable of small diameter is used, the movable jaw is provided with a skirt 29 which slidably engages the edge 28 of the body portion 10.

Besides having this function, the skirt 29 stiffens and strengthens the movable jaw 25, and because of this and so that the jaw 25 may have either end facing the body portion 10, both ends of the movable jaw 25 are provided preferably with the skirts 29.

The movable jaw 25 has a web 30 midway between its sides to separate the cables 16 and 17 from each other. At each side of the web 30, the jaw 25 is half-round to better grip the cables and prevent shifting of the cables either laterally or longitudinally, and to increase the gripping action the inner half-round surfaces 21 are provided with ribs 32 which fit in the spaces between the convolutions of the armored cable.

When the cables are clamped between the fixed jaw 22 and the movable jaw 25 by the tightening of the screws 28a, a pulling strain on the cable would have to be overcome by the screws at opposite sides of the movable jaw, and the tendency would be to break the jaw at the junction of the two half-rounded clamping surfaces 31 in the middle of the jaw. To avoid this, the web 30 which is midway between the sides of the jaw 25 is provided with an extension in the form of a lug 33 and the fixed jaw 22 is provided with a slot 34 to receive the lug 33. With this construction, pulling strain applied to the movable jaw 25 by the cable will be distributed between the lug 33 and the screws 28a, thus preventing the jaw from being broken.

The lug 33 is made sufficiently long so as to remain in the slot 34, even when the movable jaw 25 is moved as far away from the fixed jaw 22 as is necessary to insert the cables of the largest diameter which will fit into the body portion 10, and thus the lug 33 constitutes an extension of the web 30 and maintains the cavity at the receiving end of the connecter divided into two compartments, one for each of the cables, thereby assisting in the insertion of the cables and preventing the web 30 from pulling directly upon and pinching the cable instead of being disposed between the cables, as it should be.

Variations and modifications may be made within the scope of this invention, and portions of the improvements may be used without others.

Having thus described the invention, what is claimed as new and for which it is desired to obtain Letters Patent, is:—

1. A duplex connecter having a neck adapted to be inserted in a hole in an outlet box to be secured to the latter; a body portion for receiving side by side a pair of armored cables; a clamping piece and draft means therefor on the body portion to engage and clamp the movable cables to the connecter, said clamping piece being physically separate from the body portion; and a lug on the clamping piece intermediate its ends adapted to extend through an aperture in the body member and form a division wall to separate said armored cables.

2. A duplex connecter having a neck adapted to be inserted in a hole in an outlet box to be secured to the latter; a body portion for receiving side by side a pair of armored cables; a clamping piece and draft means therefor on the body portion to engage and clamp the movable cables to the connecter, said clamping piece being physically separate from the body portion; and a lug on the clamping piece intermediate its ends adapted to extend through an aperture in the body member and form a division wall to separate said armored cables, said lug being sufficiently long to remain in said aperture when said clamping piece is raised from the body portion to permit insertion of the armored cables.

3. A duplex connecter having a neck adapted to be inserted in a hole in an outlet box to be secured to the latter; a body portion for receiving side by side a pair of armored cables; a clamping piece and draft means therefor on the body portion to engage and clamp the movable cables to the connecter, said clamping piece being physically separate from the body portion and having semicylindrical sockets to fit over and engage the armored cables respectively and clamp them to the body portion; and a lug on said clamping piece between said sockets adapted to extend through an aperture in the body portion, said lug being elongated in the direction of the cable extension to form a division wall to separate said armored cables and guide the latter into said sockets respectively while locking the body portion and the clamping piece against relative shift laterally of the cables.

4. A duplex connecter having a neck adapted to be inserted in a hole in an outlet box to be secured to the latter; a body portion for receiving side by side a pair of armored cables tapering toward said neck; an extension on said body portion having screw-threaded ears and constituting a fixed jaw to clamp the cable to the connecter; a movable jaw fitting over said fixed jaw and having apertured ears aligning with the ears on said fixed jaw; screws extending through the apertures of the movable jaw ears and threaded in the fixed jaw ears for drawing the movable jaw against cables supported by said fixed jaw; and a flange on said movable jaw to close a gap between the latter and the end of the body portion when the movable jaw is drawn down on the cables.

5. A duplex connecter having a neck adapted to be inserted in a hole in an outlet box to be secured to the latter; a body portion for receiving side by side a pair of armored cables tapering toward said neck; an extension on said body portion having screw-threaded ears and constituting a fixed jaw to clamp the cable to the connecter; a movable jaw fitting over said fixed jaw and having apertured ears aligning with the ears on said fixed jaw; screws extending through the apertures of the movable jaw ears and threaded in the fixed jaw ears for drawing the movable jaw against cables supported by said fixed jaw; a flange on said movable jaw to close a gap between the latter and the end of the body portion when the movable jaw is drawn down on the cables; and a lug on the movable jaw intermediate its ends adapted to extend through an aperture in the fixed jaw to divide the space between the jaws into two cable-receiving openings and to hold the movable jaw to the fixed jaw against lateral movement when strains are applied to the cable after said movable jaw is in clamping position on the cables.

CARL G. BONDESON.